United States Patent Office 3,845,028
Patented Oct. 29, 1974

3,845,028
METHOD OF INCREASING MOLECULAR
WEIGHT OF POLYMER
Tristram Walker Bethea and Adel Farhan Halasa,
Akron, Ohio
No Drawing. Continuation of application Ser. No. 82,157,
Oct. 19, 1970, which is a continuation of application
Ser. No. 776,817, Nov. 18, 1968, both now abandoned.
This application Dec. 4, 1972, Ser. No. 312,207
Int. Cl. C08d 5/02, 5/04
U.S. Cl. 260—85.1                                    1 Claim

ABSTRACT OF THE DISCLOSURE

The molecular weight of a lithiated unsaturated polymer is increased by treatment with a salt of a transition metal, preferably also with an organometallic compound.

This is a continuation of application Ser. No. 82,157 (now abandoned), filed Oct. 19, 1970, which in turn is a streamline continuation of application Ser. No. 776,817 (now abandoned), filed Nov. 18, 1968.

This invention relates to increasing the molecular weight of a polymer by joining lithiated polymers of a lower molecular weight. The polymers capable of being joined are lithiated homopolymers of a conjugated diene containing 4 to 6 carbon atoms or lithiated copolymers of such conjugated dienes or lithiated copolymers of such a conjugated diene and a vinyl monomer. The products are not lithiated; they are rubbery.

To increase the molecular weight, the polymer is treated with a salt of a transition metal of Group VI-B, and preferably also an organometallic of metal of Group I-A, II-A, II-B or III-A.

The lithiated polymers include, for example (a) the lithiated homopolymers of conjugated dienes containing 4 to 6 carbon atoms, including 1,3-butadiene, isoprene, piperylene, and 2,3-dimethyl butadiene; (b) lithiated copolymers of such dienes; and (c) lithiated copolymers of any one or more of these dienes with one or more vinyl monomers including styrene, methyl methacrylate, vinyl chloride, styrene derivatives such as alphamethylstyrene, and other recognized comonomers which on copolymerization with such a diene produce synthetic rubbers.

The salts of the transition metals are preferably chlorides, although other halides (bromides, iodides and fluorides) may be used as well as oxyhalides, sulfates, nitrates, acetonates, acetylacetonates, alkoxides, phosphates, etc. The metal is preferably tungsten although molybdenum and chromium salts may be used. The preferred compound is a halide, and particularly tungsten hexachloride or molybdenum pentachloride.

The organometallic is preferably a derivative of aluminum; however, an organometallic of another metal of Group I-A, II-A, II-B or III-A may be used.

The salts of the transition metals include, for example:

molybdenum pentachloride
molybdenum pentafluoride
molybdenum hexabromide
molybdenum dichloride
molybdenum oxytribromide
molybdenum nitrate
molybdenum acetylacetonate
molybdenum sulfate
molybdenum phosphate
molybdenum pentaethoxide
molybdenum perchlorite
tungsten dichloride
tungsten pentabromide
tungsten hexafluoride
tungsten oxytetrachloride
tungsten-sulfate
chromous chloride
chromic chloride
chromous nitrate
chromic nitrate
chromium oxychloride
chromium orthophosphate
chromous sulfate
chromic-sulfate, etc.

The organometallic compounds which may be used include compounds which comprise alkyl groups of 1 to 10 carbon atoms, phenyl, naphthyl and methyl and ethyl derivatives of phenyl and naphthyl. Thus they include, for instance:

trimethylaluminum
triethylaluminum
tripropylaluminums
tributylaluminums
triamylaluminums
trihexylaluminums
triheptylaluminums
trioctylaluminums
trinonylaluminums
tridecylaluminums
triphenylaluminum
trinaphthylaluminums
tritolylaluminums
trimethylnaphthylaluminums
monoalkylaluminum dihalides
dialkylaluminum halides
monoarylaluminum dihalides
diarylaluminum halides and the corresponding alkyl derivatives of lithium, sodium, potassium, rubidium, cesium, beryllium, magnesium, calcium, barium, strontium, zinc, cadmium, gallium, indium and thallium. These include, for example:

methyl lithium
ethyl sodium
propyl potassiums
butyl rubidiums
amyl cesiums
butyl-lithiums
phenyl lithium
naphthyl lithiums
dimethyl magnesium
diethyl calcium
dipropyl bariums
diamyl strontiums
dihexyl zincs
dioctyl cadmiums
trinonyl galliums
tridecyl indiums
trimethyl thallium
methyl magnesium halides
ethyl calcium halides
propyl zinc halides
butyl cadmium halides
amyl gallium halides
hexyl indium halides
heptyl thallium halides
octyl beryllium halides
phenyl barium halides
naphthyl-strontium halides The molar ratio of the amount of the organometallic compound to the salt of the transition metal used, may be varied from about 0.1 to 10, but usually substantially equal molar amounts of the two components will be used. About 0.01 to 10.0 moles of the combined weight of the two components will be used for each mole of live lithium in the polymer being treated. Usually, about 2 moles (one mole of each component) will be found satisfactory.

The catalyst components may be added separately to the reaction mixture, or they may be previously mixed and allowed to stand and react with one another prior to addition to the reaction mixture.

The preferred catalyst is a combination of triisobutyl aluminum with tungsten hexachloride in hydrocarbon solvent.

The joining reaction is carried out in the reaction mixture in which the polymerization is carried out, without removal of the lithium from the polymer. Sodium polymers may be used.

The joining reaction results in a rubbery polymer having:

1. Increased molecular weight.
2. Broader molecular weight distribution.
3. Decreased cold-flow properties.
4. Increased Williams recovery.
5. Substantial change in microstructure may occur.

The following examples are illustrative:

EXAMPLE 1

To a standard one-gallon reactor was added 3000 g. of a 17.6% butadiene-heptane solution (528 g. butadiene, 9.77 mole). Hexane or other hydrocarbon solvent may be used instead of heptane. Often heptane-hexane is used. The temperature of the solution was raised to 50° C. The polymerization of the butadiene was initiated by injecting 5.65 ml. of 1.12M (6.33 mmole) butyllithium in hexane with a syringe into the reactor through an injection port capped with a rubber septum. (This amount of butyllithium includes that necessary to kill impurities present as well as that used to initiate the polymerization.) The polymerization was allowed to proceed at 50° C. until the pressure was constant (4 hours). A sample of this cement was taken, the lithium was killed and the polymer was coagulated with methanol (Sample A).

After the reactor and contents had cooled to room temperature, 70 ml. of 0.102M $WCl_6$ in benzene, (7.14 mmole) followed by 17.4 ml. of 0.409M triisobutylaluminum in heptane (7.12 mmole) was added to the vigorously stirred polymer solution. Samples (B–E) were taken periodically after the lapse of the times shown in the following table, by forcing the polymer out through an orifice in the bottom of the reactor with pressure. The samples were collected directly in methanol containing antioxidant.

| Sample: | Time, minute | DSV | Percent Cis-1,4 | Trans-1,4 | 1,2 |
|---|---|---|---|---|---|
| A | 0 | 1.48 | 36.8 | 55.2 | 8.0 |
| B | 5 | 2.57 | 34.5 | 57.1 | 8.4 |
| C | 10 | 2.70 | 35.3 | 56.4 | 8.2 |
| D | 20 | 2.56 | 33.5 | 58.1 | 8.3 |
| E | 25 | 2.63 | 34.9 | 56.9 | 8.2 |

No gel was formed. The stereo composition of the polymer remained substantially constant. The rise in DSV occurred within 5 minutes and no substantial rise occurred after that time, showing that the joining reaction was substantially completed within not more than 5 minutes. (The variation in the DSV of the joined polymers is of no consequence.)

We claim:

1. The process of increasing the molecular weight of a polymer of the class consisting of terminally lithiated homopolymers of conjugated dienes containing 4 to 6 carbon atoms and terminally lithiated copolymers of such conjugated dienes and a vinyl monomer, which comprises joining the units of the polymer with substantially equimolar amounts of tungsten hexachloride and triisobutylaluminum which causes joining of the polymer and production of a polymer of increased molecular weight.

References Cited

FOREIGN PATENTS

| 992,210 | 5/1965 | Great Britain. |
| 1,451,554 | 7/1966 | France. |

OTHER REFERENCES

Molecular Weight Jump Reactions by Engle et al., Rubber Age, December 1964, pp. 410–415.

Friedel-Crafts & Related Reactions, vol. I by George Olah (1963) Interscience Publ.

JOSEPH L. SCHOFER, Primary Examiner

W. F. HAMROCK, Assistant Examiner

U.S. Cl. X.R.

260—94.7 HA

PO-1050
(5/69)

UNITED STATES PATENT OFFICE
CERTIFICATE OF CORRECTION

Patent No. 3,845,028            Dated October 29, 1974

Inventor(s) Tristram Walker Bethea and Adel Farhan Halasa

It is certified that error appears in the above-identified patent and that said Letters Patent are hereby corrected as shown below:

In column one, after line 6, the following should be added which was inadvertently left out:

--Assignee: The Firestone Tire & Rubber Company, Akron, Ohio --

Signed and sealed this 27th day of May 1975.

(SEAL)
Attest:

RUTH C. MASON
Attesting Officer

C. MARSHALL DANN
Commissioner of Patents
and Trademarks